May 12, 1970          J. D. HARRIS          3,510,931

MACHINE FOR US IN ASSEMBLING BATTERY PLATE PACKS

Filed Dec. 14, 1967          3 Sheets-Sheet 1

INVENTOR
JOHN DEREK HARRIS
BY
ATTORNEYS

United States Patent Office 3,510,931
Patented May 12, 1970

3,510,931
MACHINE FOR USE IN ASSEMBLING BATTERY
PLATE PACKS
John Derek Harris, Solihull, England, assignor to Joseph
Lucas (Industries) Limited, Birmingham, England
Filed Dec. 14, 1967, Ser. No. 690,571
Claims priority, application Great Britain, Dec. 15, 1966,
56,174/66
Int. Cl. H01m 35/18
U.S. Cl. 29—204                                     9 Claims

ABSTRACT OF THE DISCLOSURE

A machine which, together with a plurality of similar machines, can be used in assembling battery plate packs, includes a magazine into which a plurality of one of the components of the battery plate pack is stacked on edge, a reciprocable slide for removing the components singly from the magazine, and a chute into which the slide feeds the components. The shape of the chute is such that a component in the chute can be transferred automatically from the chute to a conveyor running beneath the chute by the action of a part moving with the conveyor.

---

This invention relates to a machine which, together with a plurality of similar machines, can be used in assembling battery plate packs (i.e. packs of battery plates and separators which in use are inserted in the compartments of an electric storage battery to constitute the cells of the battery).

A machine according to the invention includes a magazine in which in use a plurality of one of the components of the battery plate pack is stacked on edge, a reciprocable slide for removing the components singly from the magazine, and a chute into which the slide feeds the components, with the shape of the chute being such that a component in the chute can be automatically transferred from the chute to a conveyor running beneath the chute by the action of a part moving with the conveyor.

In use, a plurality of such machines are employed in side-by-side relationship successive machines delivering battery plates and separators to their chutes. The plates and separators are then removed automatically from the chutes to form a pack.

Figure 1:
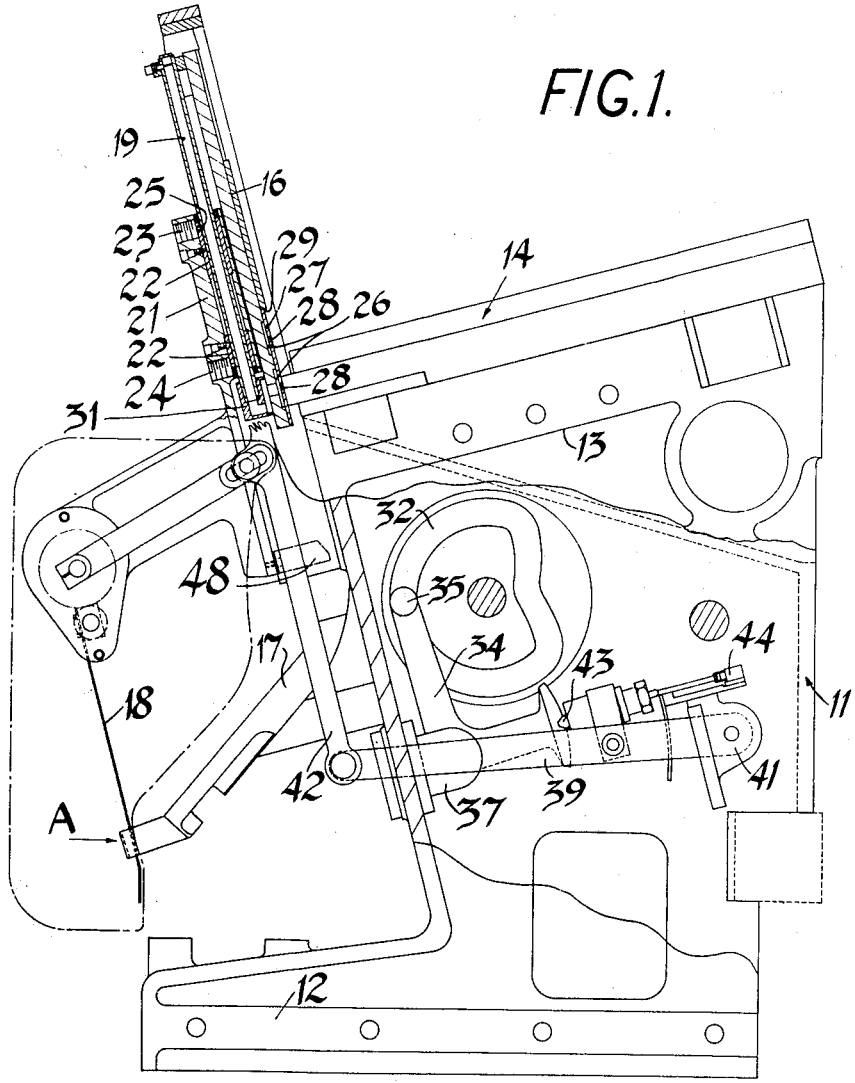
Figure 2:
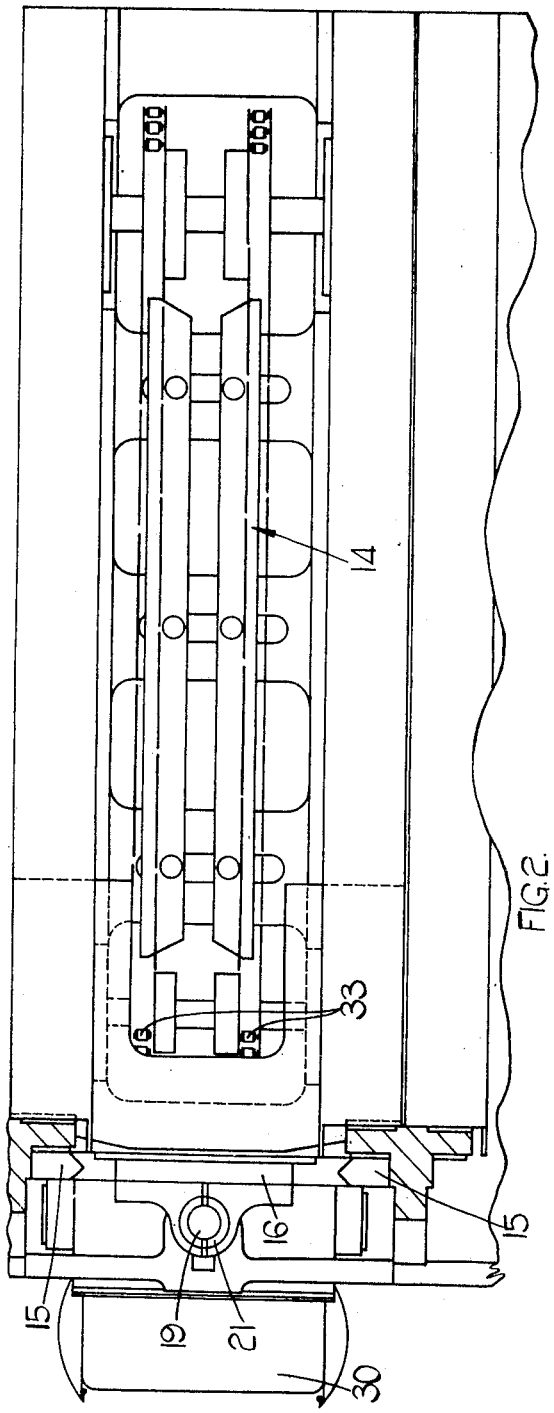
Figure 3:
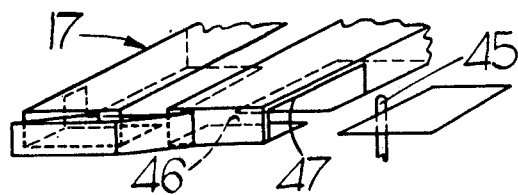
Figure 4:
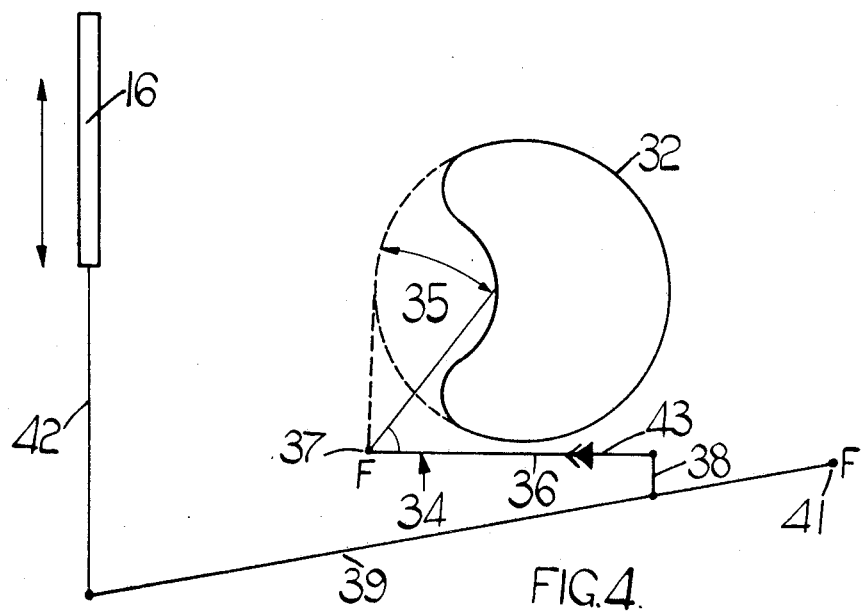

One example of the invention is illustrated in the accompanying drawings wherein FIG. 1 is a part sectional view of a machine for transferring separators from a magazine to a conveyor, FIG. 2 is a plan view of the machine shown in FIG. 1, FIG. 3 is a fragmentary view in the direction of arrow A in FIG. 1 and FIG. 4 is a diagrammatic representation of the operating mechanism in FIG. 1.

Referring to the drawings the machine comprises a frame 11 including feet 12 through which the machine is secured to a horizontal bed. Upper surface 13 of the frame is inclined to the horizontal and constitutes a magazine 14 in which separators are stacked. The separators (not shown) are stacked in face to face relationship and stand on edge in the magazine 14. The front face of the frame 11 is at right angles to the surface 13 and includes guides 15 (FIG. 2). Engaged with the guides 15 is a slide 16 which is reciprocable at right angles to the magazine 14. At the lower limit of reciprocation of the slide 16 there is provided a chute 17 which, in use, guides separators transferred from the magazine by the slide 16 to a position above an inclined carrier mounted on a horizontal conveyor (not shown) on which the battery packs are built up.

The slide 16 includes a hollow rod 19 which is slidably received in a pair of bushes 22 mounted in a member 21 carried by the frame 11. The member 21 includes at its upper end a conduit 23 which is connected to a source of vacuum and at its lower end a conduit 24 which is connected to a source of compressed air. The upper end of the rod 19 is sealed and the rod includes a passage 25 which in the uppermost position of the slide, registers with the conduit 23 and in the lowermost position of the slide 16, registers with the conduit 24.

The lower end of the face of the slide 16 presented to the magazine is formed with a recess of substantially the same dimensions as a separator. The base of the recess is formed with an annular channel 26 which is covered by a plate 27 having therein a plurality of holes 28, with an outwardly directed shoulder 29 being defined between the plate 27 and the remainder of the slide 16, and the shoulder 29 is substantially equal in width to the thickness of one separator. The channel 26 communicates with the bore in the rod 19 by way of a manifold 31 having a filter 30 (FIG. 2) associated therewith. Thus, when the passage 25 registers with the conduit 23, the channel 26 is subject to a vacuum and when the passage 25 registers with the conduit 24, the channel 26 is supplied with compressed air.

The frame 11 carries a main drive shaft from which is driven a rotary cam 32 which governs the reciprocatory motion of the slide 16.

The main drive shaft also drives a pair of endless chains 33 (FIG. 2) which extend along the base of the magazine 14. The chains 33 engage the lower edges of the separators in the magazine but are in no way connected thereto, so that as the chains are driven, the separators within the magazine are urged towards the slide 16 by virtue of the friction between the separators and the chains 33.

Referring now particularly to FIG. 4, the cam 32 is rotated continuously by the main drive shaft. Engaged with the cam is one end 35 of a bell crank lever 34 which is pivotally supported on the frame at 37. The other end 36 of the lever 34 is pivotally engaged with a link 38 which in turn is pivotally engaged with a lever 39. One end of the lever 39 is pivotally supported at 41 on the frame 11 and the other end of the lever 39 is pivotally engaged with a connecting rod 42 which carries the slide 16. Thus, as the cam 32 rotates, the bell crank lever 34 is pivoted so causing the lever 39 to be pivoted about the pivot 41 thereby reciprocating the slide 16. The bell crank lever 34 includes a breakable linkage 43. Should the slide 16 become jammed, the lever 39 and link 38 will become fixed but the cam 32 will continue to rotate. In this event, the bell crank lever 34 will be strained and the linkage 43 will break to avoid damage to the machine. In practice the linkage 43 will include a microswitch 44 (FIG. 1) operable upon breakage of the linkage 43 to operate a warning device whereby an operator will be notified of the malfunction of the machine, or to stop the machine itself.

The operation of the machine is as follows. When the slide 16 is in its uppermost position, the channel 26 is subjected to a vacuum and a separator from the magazine is urged against the plate 27 of the slide 16 by the chains 33. The upper edge of the separator engages the shoulder 29 and the separator is held in contact with the plate 27 against gravity by the vacuum in the channel 26 to which it is subject through the holes 28 in the plate 27, and by friction with the adjacent separator in the magazine. As the slide 16 moves downwardly, it carries the separator therewith, and the thickness of the slide 16 is sufficient to prevent the next separator in the magazine dropping between the front face of the frame 11 and the slide 16. When the slide 16 reaches its lowermost position, the passage 25 registers with the conduit 24 and the channel 26 is supplied with compressed air which blows the separator clear of the plate 27, whereupon the separator drops into the uppermost end of the chute 17. The chute is closed at its lower end to prevent the separator falling from the end of the chute. Should any dust or particles of separator material enter the manifold 31 when suction is applied to the separator they will be trapped by the filter.

As the separator descends the chute 17 a partly formed battery plate pack is being carried on an inclined conveyor and the arrangement is such that the pack passes under the chute fractionally after the separator has reached the lower end thereof. The conveyor includes an upwardly extending finger 45 which passes through a channel 46 in the end of the chute 17 and carries the separator through a gap 47 in the side wall of the chute, and the arrangement is such that as the separator leaves the chute it will be correctly positioned on the partly formed battery plate pack.

In practice, a plurality of similar machines are used to produce a complete battery plate pack, with alternate machines transferring battery plates and separators of the pack.

When it is desired to utilize a machine of the kind described to transfer battery plates from a magazine onto a pack, certain modifications must be made to the machine. These modifications are indicated in the drawings in chain dotted lines and within chain dotted enclosures.

When using such a machine to transfer battery plates the conduits 23, 24 are disconnected from the sources of vacuum and compressed air respectively. The operation of the machine when transferring battery plates is similar to that when transferring separators. As the slide 16 reaches its uppermost position a battery plate is urged against the plate 27 by the chains 33 and the battery plate is held against gravity solely by the friction between the battery plate and the plate 27 and between the battery plate and the adjacent battery plate in the magazine.

At its lowermost position, the slide 16 engages a pair of ramp members 48 which guide the battery plate away from the slide 16 into the upper end of the chute 17. The chute 17 is in two parts (FIG. 3) and an arm 18 is movable between the two parts in response to movement of the slide 16. When the slide 16 reaches its lowermost position and the battery plate is discharged into the top end of the chute 17, the arm 18 will be positioned at the top end of the chute 17 to support the battery plate within the chute. As the slide 16 moves upwardly to pick up a second battery plate, the arm 18 moves toward the lower end of the chute 17. Thus, the descent of the battery plate within the chute 17 is controlled by the arm 18, it being appreciated that were the battery plate allowed to fall freely down the chute it would be be damaged as it collided with the closed end of the chute.

Having thus described my invention what I claim as new and desire to secure by Letters Patent is:

1. A machine for use in assembling battery plate packs including a magazine on which a plurality of one of the components constituting the battery plate pack are stacked in face to face relationship and stand on edge, a slide arranged at one end of the magazine and reciprocable at right angles to the magazine for removing the components singly from the magazine, and a chute beneath the slide into which the slide feeds the components, the shape of the chute being such that a component in the chute can be automatically transferred from the chute to a conveyor running beneath the chute by the action of a part moving with the conveyor.

2. The machine as claimed in claim 1 wherein said magazine includes means for urging said plurality of components towards a position wherein said components can be removed singly from the magazine by said reciprocable slide.

3. The machine as claimed in claim 2 wherein said means includes an endless moving chain which makes contact with the lower edges of the components and which is driven in such a direction that the frictional engagement of the chain with components urges said components towards said position.

4. The machine as claimed in claim 1 wherein the components are separators and said slide is reciprocable between a first position wherein it removes a separator from said magazine and a second position wherein the separator is fed into said chute, said slide including means operable in the first position of the slide for applying a vacuum between the slide and the separator so that said component is held in contact with the slide, and further means operable in the second position of said slide for negating said vacuum so that the separator is released from the slide.

5. The machine as claimed in claim 4 wherein said further means negates said vacuum by supplying compressed air between said separator and the slide.

6. The machine as claimed in claim 1 wherein said components are battery plates and said chute extends downwardly between the part of the chute into which the battery plates are fed to the part of the chute from which the battery plates are transferred to said conveyor, further including means for limiting the speed at which the battery plate descends the chute.

7. A machine for use in assembling battery plate packs including the magazine in which a plurality of battery plates are stacked on edge, a reciprocable slide operably related to the magazine for removing the plates singly from the magazine, an endless chain operably related to the magazine and adapted to make contact with the lower edges of the battery plates and driven in such a direction that the frictional engagement of the chain with the plates urges the plates toward a position wherein the plates can be removed singly from the magazine by the reciprocable slide, a chute into which the slide feeds the battery plates, the shape of the chute being such that a plate in the chute can be automatically transferred from the chute to a conveyor running beneath the chute by the action of a part moving with the conveyor, said chute extending downwardly between the part of the chute into which the plates are fed to the part of the chute from which the plates are transferred to the conveyor and means for limiting the speed at which the battery plate descends the chute, said means for limiting the speed of descent of the battery plate including an arm movable within said chute between said parts of the chute and which is arranged to be engaged by a battery plate as the battery plate is fed into the chute and which is arranged to move at a predetermined speed from the part of the chute into which the battery plates are fed to the part of the chute from which the battery plates are transferred to said conveyor while supporting said battery plate.

8. The machine as claimed in claim 7 wherein said arm is operatively connected to said slide so as to move in response to movement of said slide.

9. The machine as claimed in claim 1 wherein said slide is formed with a recess within which a component being removed from said magazine is engaged.

References Cited

UNITED STATES PATENTS 3,267,566   8/1966   Ouellete.
3,302,278   2/1967   Whitney.
3,375,567   4/1968   Watson.

THOMAS H. EAGER, Primary Examiner

U.S. Cl. X.R.

29—211